No. 719,771. PATENTED FEB. 3, 1903.
R. C. T. EVANS.
OPTICAL DEVICE FOR ADVERTISING OR OTHER PURPOSES.
APPLICATION FILED FEB. 27, 1902. RENEWED DEC. 31, 1902.
NO MODEL.
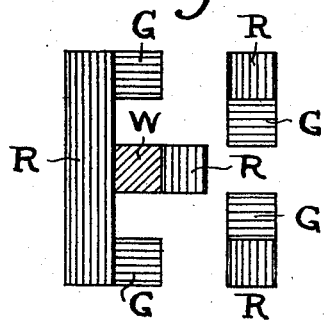
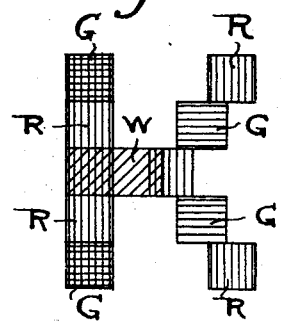
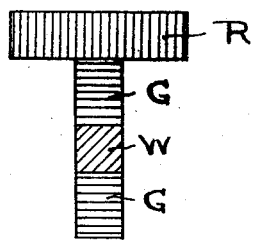
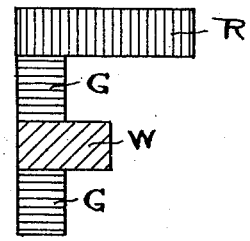
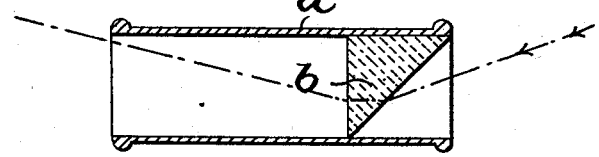
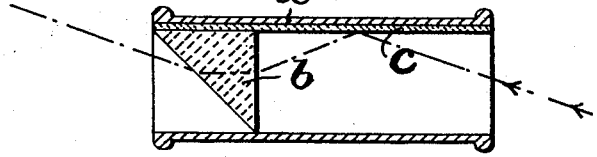
Witnesses
Inventor
R. C. T. Evans
By
H. B. Willson & Co.
Attorneys

UNITED STATES PATENT OFFICE.

ROBERT CECIL TURLE EVANS, OF LONDON, ENGLAND.

OPTICAL DEVICE FOR ADVERTISING OR OTHER PURPOSES.

SPECIFICATION forming part of Letters Patent No. 719,771, dated February 3, 1903.

Application filed February 27, 1902. Renewed December 31, 1902. Serial No. 137,374. (No model.)

*To all whom it may concern:*

Be it known that I, ROBERT CECIL TURLE EVANS, a subject of the King of Great Britain, residing at 9 Heathcote street, Gray's Inn road, London, England, have invented certain new and useful Improvements in Optical Devices for Advertising or other Purposes; and I do declare the following to be a full, clear, and exact description of the invention, such as will enable others skilled in the art to which it appertains to make and use the same.

It is well known that if a ray of white light is caused to pass through a transparent prism this ray of light is bent and resolved into its component colors, so as to form a band of colors or spectrum which may be projected onto a screen. If, on the other hand, the process be reversed and such a band of colors be looked at through a prism, these small patches of color will be apparently superimposed on one another at a point apparently some distance away from the colored band, and the eye will there behold a patch of white light. If isolated patches of colored material be gazed at through a prism, these patches will apparently shift away from their actual position, the apparent position being near or farther away from the actual position, according to whether they belong to the red or the blue end of the spectrum, respectively.

My invention consists in applying this principle as discovered by Sir Isaac Newton to the manufacture of an optical device or toy primarily intended to be employed for advertising purposes.

In carrying the first part of my invention into effect I provide a background of cardboard or other suitable material and preferably of a dull-black color, having what is popularly known as a "matte" surface, and affix thereto or paint thereon various brightly-colored bars or strips adjusted at such intervals and at such angles to one another that when viewed through a suitably-mounted prism the actually irregular bars of color apparently shift with respect to the background and to one another to the right or to the left or up and down, as the case may be, so as to form apparently continuous or connected bars of color. The various squares or bars of color may easily be so arranged with respect to one another on the background that when viewed through a prism they take up positions so as to form letters or designs, which without the aid of the prism would be quite illegible.

According to a modification of my invention I arrange letters of various primary colors on a background in such a manner that though each individual letter may be read with the naked eye the sequence of the letters cannot easily be ascertained until the device is viewed through a prism, when, owing to the apparent moving of the letters of certain colors with respect to the others, the sequence may readily be made out.

In order that my invention may be readily understood, I will now refer to the accompanying drawings, which show diagrammatically two examples of designs, in these cases letters, prepared in accordance with the invention and also two preferred constructions of a prismatic appliance to be used for viewing them.

Figure 1 represents an arrangement of colored squares and strips as actually prepared, the respective colors being indicated by reference-letters and by varied hatching, as will be described hereinafter; and Fig. 2 represents approximately the result as seen through a prism. Figs. 3 and 4 are similar views to Figs. 1 and 2, but showing an example of one letter becoming another when viewed through a prism. Fig. 5 is a section of a simple form of prismatic device for viewing the designs, and Fig. 6 is a section of a modified form in which a mirror is combined with the prism.

Referring first to Figs. 1 and 2, it will be seen that in the actual design, Fig. 1, the colors red, green, and white (indicated by the reference-letters R, G, and W, respectively, and by varied hatching) alone are employed, the background being preferably a dull black, as already mentioned. When viewed through a prism, the red and green light-rays are differently refracted, and from the white square a complete spectrum is obtained, the result being apparent movements, but of different degree, of the squares and strips, combined with the production of very attractive color phenomena. Consequently the actual three-color disorderly and apparently meaningless design becomes a clearly-defined many-colored design—in this case the letter "K." The color effects, which cannot be set forth on the drawings, result partly from the apparent superimposition of one color upon another and partly from the dispersion of colored light-rays which the prism effects even when the object viewed is apparently monocolored.

In the design shown in Fig. 3 the phenomena of refraction and dispersion are utilized to give an erroneous effect, for although the actual letter is "T," when viewed through a prism it becomes the letter "F," the green squares with modified colors apparently moving to the end of the red bar to form the upright of the letter and the white square elongating to a complete spectrum to form the halfway bar. Similarly other designs, more or less complicated, may be prepared, so that from a disorderly or misleading collection of colored bars and strips an advertising design, word or phrase, or picture may be revealed when observed through a prism with color effects not visible with the naked eye. The letters or designs may also be so arranged that the parts of one are mixed with the parts of the next, but when viewed through the prism they separate out and the actual confusion becomes order. Moreover, by combining with the prism a mirror, the reversing properties of which are well known, it is possible to so arrange that the letters or designs are reversed right to left or upside down to produce the advertisement or the like.

Although I have described only the use of three colors—red, green, and white—on a black background, other colors, suitably selected according to their refractive indices, may of course be employed, and the background may be other than black, the result being further strange and interesting color phenomena; but whatever the colors may be the principles set forth above will govern their selection and arrangement. Also in some cases I may take advantage only of the color phenomena of refraction, making the letters or designs all of one color, or approximately so, in which case they appear with new colors when viewed through the prisms, and the effect is furthermore enhanced by a shading which appears under these conditions.

A further part of my invention refers to the optical instrument by means of which such colored inscriptions, designs, &c., may be read or made out. I provide a paper or cardboard tube open at both ends and measuring, preferably, about one and one-half to two inches in length and of about two-thirds of an inch in diameter. Close to one end and inside this tube I arrange a small triangular glass prism, with its axis at right angles to the axis of the paper tube, and between this prism and the opposite end of the tube the tube is unobstructed to leave a clear space for the passage of the light-rays. That end of the tube containing the prism may or may not then be covered with a cover having a small circular aperture for the eye. On applying the eye to the end of the tube nearest that at which the prism is situated and gazing through it in the direction of such a device as those before mentioned and moving the tube about slightly in different directions the device will come into view. The tube must then be held still and rotated upon its own axis until the device can be read.

In Fig. 5 I illustrate a very suitable form of the prismatic device. It consists of a tube $a$, of metal, cardboard, or the like, having near one end a prism $b$, mounted. A cover having an eye-aperture may be provided, if desired. The direction of vision is indicated on the figure.

In Fig. 6 I show the combination, with the prism $b$, of a mirror $c$ for use as already set forth. Any suitable prismatic device may, however, be employed or a plain prism, also a double device may be used having two prisms, one for each eye, as in a stereoscope, to enable stereoscopic observation to be made.

What I claim as my invention, and desire to secure by Letters Patent, is—

An optical device for advertising purposes, consisting of strips or bars of different colors, systematically arranged to produce apparent disorder, the various colors being so selected and relatively located in the system as to produce an orderly and intelligible arrangement when viewed through a prism, substantially as and for the purpose described.

In testimony whereof I have hereunto set my hand in presence of two subscribing witnesses.

ROBERT CECIL TURLE EVANS.

Witnesses:
ROGELIO PLAZA,
JOHN FRANCIS GAIRNS.